United States Patent [19]
Strait

[11] Patent Number: 5,775,188
[45] Date of Patent: Jul. 7, 1998

[54] APPARATUS FOR AND METHOD OF FACING SURFACES

[75] Inventor: David S. Strait, Centerville, Wash.

[73] Assignee: Climax Portable Machine Tools, Inc., Newberg, Oreg.

[21] Appl. No.: 610,111

[22] Filed: Feb. 29, 1996

[51] Int. Cl.$^6$ .................................................. B23B 5/04
[52] U.S. Cl. ............................ 82/1.11; 82/128; 82/131; 408/147; 409/179
[58] Field of Search .......................... 82/113, 131, 128, 82/1.11; 409/190, 132, 143, 191, 179; 408/147, 80, 1 R

[56] References Cited

U.S. PATENT DOCUMENTS

| | | |
|---|---|---|
| 1,138,423 | 5/1915 | Swanberg . |
| 1,791,546 | 2/1931 | Wise . |
| 2,358,741 | 9/1944 | Shelby ................................. 77/4 |
| 3,630,109 | 12/1971 | MacMichael et al. .................... 82/4 C |
| 3,908,491 | 9/1975 | Gilmore ................................. 82/113 |
| 4,050,836 | 9/1977 | Anders ................................. 409/143 X |
| 4,176,565 | 12/1979 | Christoph ............................... 82/12 |
| 4,250,777 | 2/1981 | Sorenson .............................. 408/147 X |
| 4,277,210 | 7/1981 | Murray ................................. 409/191 |
| 4,314,491 | 2/1982 | Hartmann et al. ....................... 82/128 |
| 4,369,007 | 1/1983 | Canady ................................. 409/190 |
| 4,369,679 | 1/1983 | Jones .................................. 82/128 |
| 4,463,633 | 8/1984 | Grimsley .............................. 82/128 |
| 4,483,223 | 11/1984 | Nall et al. ............................. 82/113 |
| 4,637,285 | 1/1987 | Mizoguchi ............................. 82/2 E |
| 4,770,074 | 9/1988 | Kwech ................................. 82/113 |
| 4,944,205 | 7/1990 | Ricci .................................. 82/113 |
| 4,981,055 | 1/1991 | VanderPol et al. ...................... 82/113 |
| 5,050,291 | 9/1991 | Gilmore ............................... 29/560 |
| 5,429,021 | 7/1995 | Astle et al. ........................... 82/123 |

FOREIGN PATENT DOCUMENTS

| | | | |
|---|---|---|---|
| 832988 | 3/1952 | Germany ............................ 82/113 |
| 1234054 | 5/1986 | U.S.S.R. ............................ 82/131 |
| 8300648 | 3/1983 | WIPO ............................... 82/113 |

*Primary Examiner*—William R. Briggs
*Attorney, Agent, or Firm*—Dellett and Walters

[57] ABSTRACT

A portable facing head comprises a feed body portion in threaded engagement with lead screws that extend through the feed body. The lead screws are translated through the feed body by a worm gear enclosed within the feed body wherein the worm gear is rotated by action of a star feed. The star feed is rotated by contact with a cam member extending outwardly from a torque bar positioned adjacent the feed body such that upon rotation of the feed body about a rotational axis, the star feed is incrementally rotated by the cam member thereby effecting incremental rotation of the worm gear and incremental linear translation of the lead screws through the feed body. Directional movement of the lead screws through the feed body is selectively set at forward, reverse or zero during rotation of the feed body by manipulation of a torque arm handle to position the cam member.

15 Claims, 5 Drawing Sheets

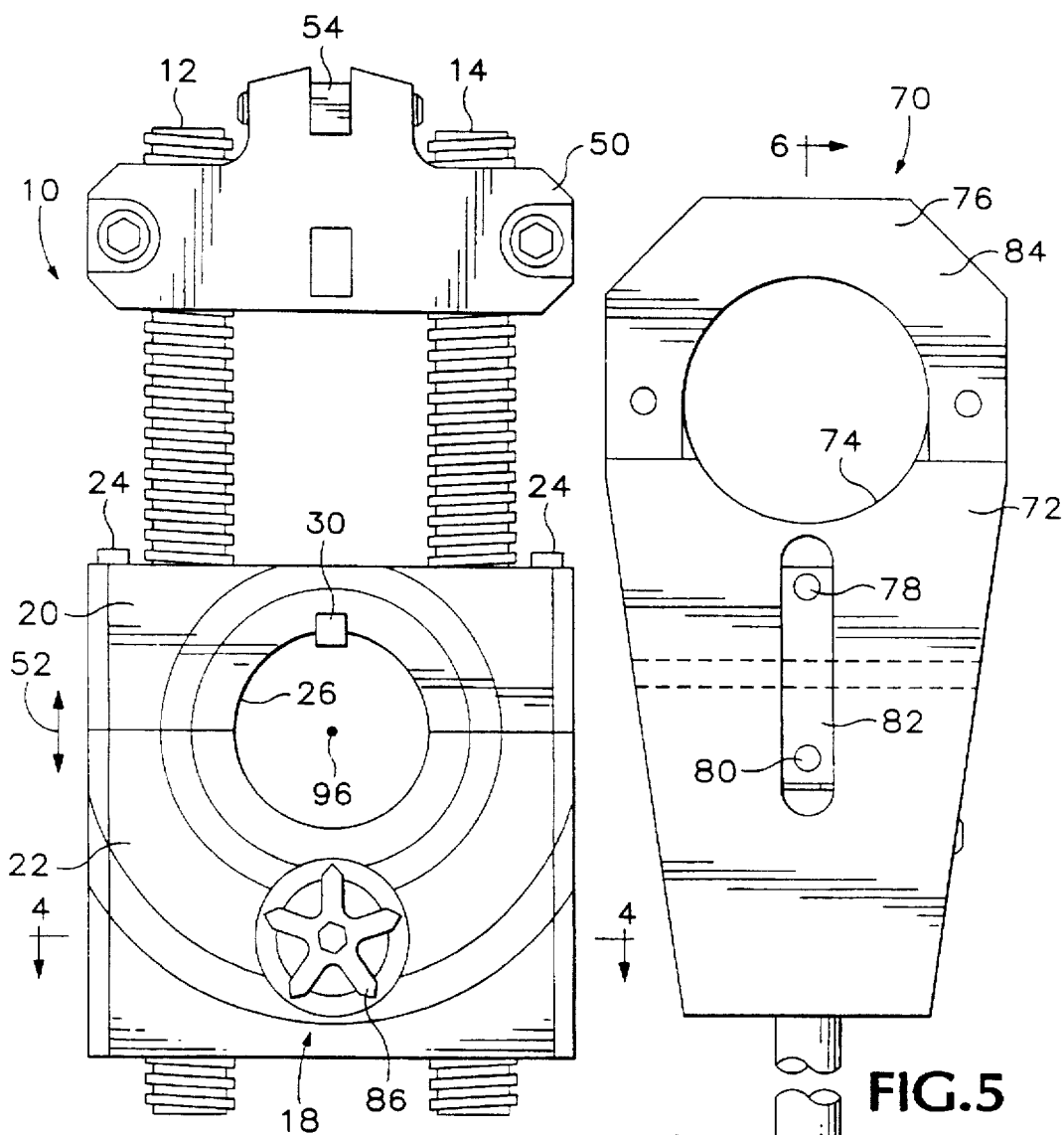
FIG. 2
FIG. 5
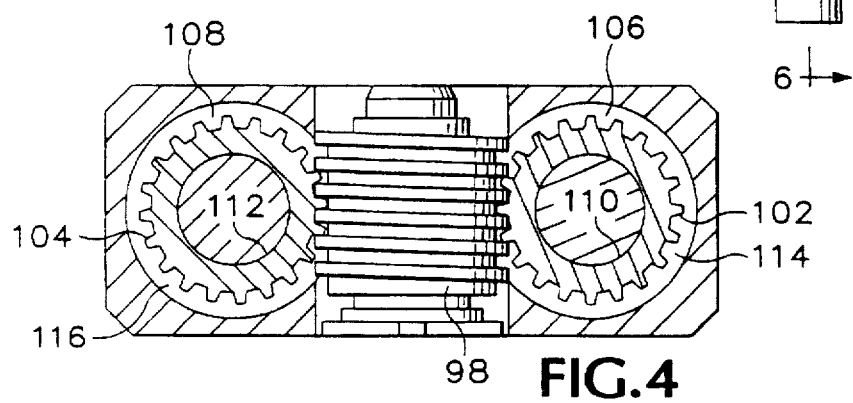
FIG. 4

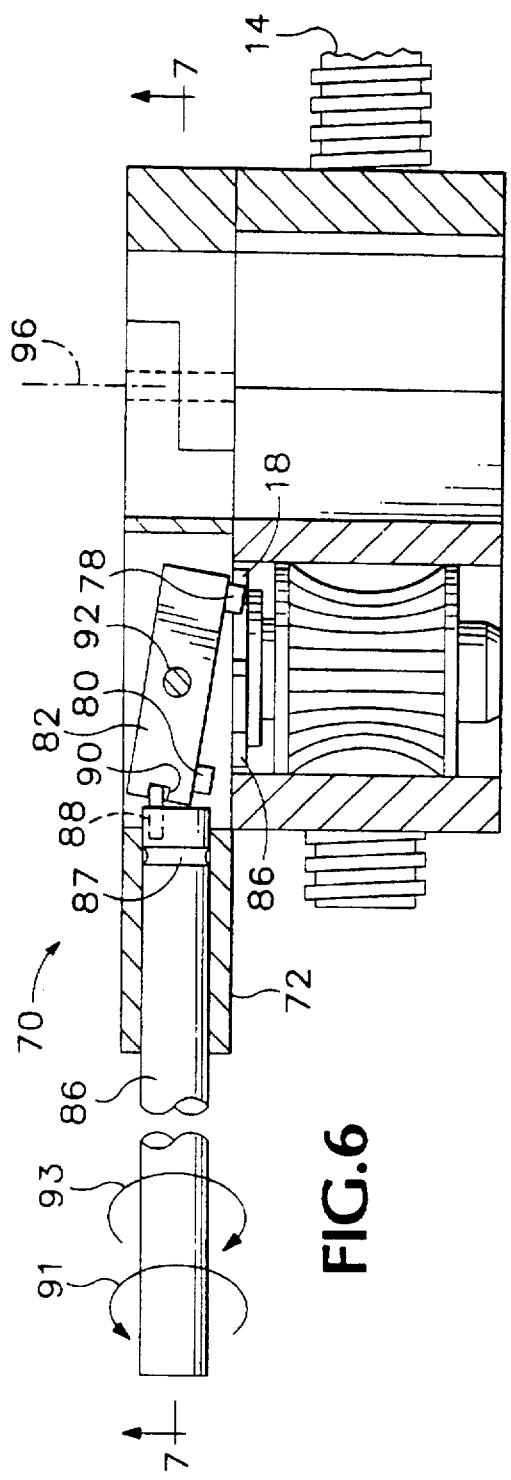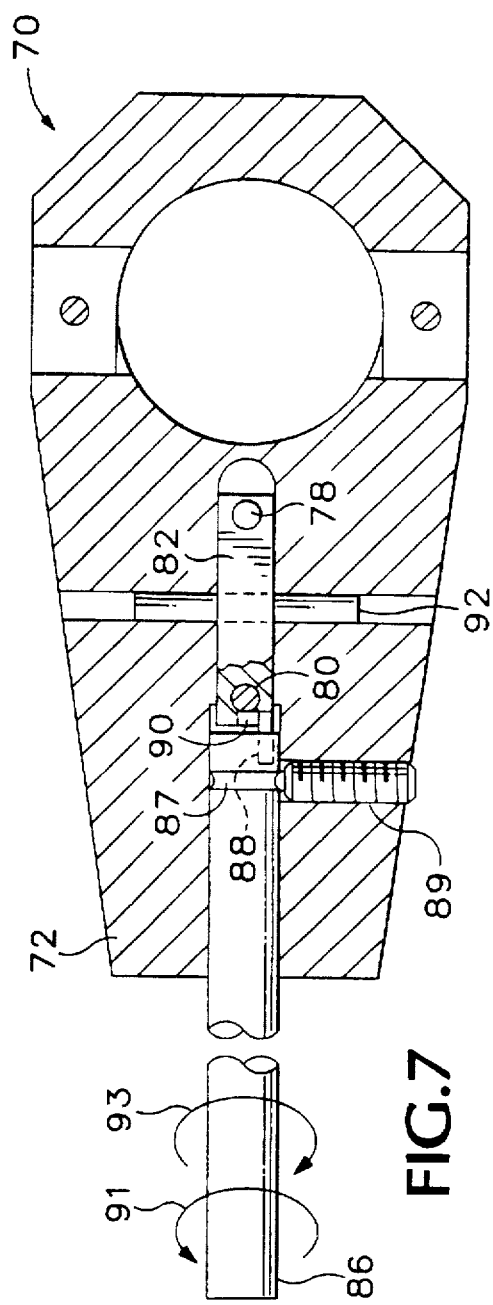

APPARATUS FOR AND METHOD OF FACING SURFACES

The present invention relates to a portable facing head and method for facing surfaces, and more particularly, to a facing head that is compact in construction and permits adjustment during operation of the facing head's radial facing direction.

BACKGROUND OF THE INVENTION

Portable machining tools are adapted to be mounted on or adjacent to a work to be machined, rather than requiring the work to be transported to a stationary tool. In pipeline applications, the machining of flange faces on large sections of pipe can be more easily accomplished in the field, since it is often difficult or impossible to disconnect pipe sections for transporting them to a machine shop. The same problem occurs in the machining of large parts and housing means utilized in power plants, ocean going vessels, or for that matter in any application where the component to be machined is exceptionally large or difficult to move.

Portable flange facing devices are available which mount either on the inside diameter of a pipe or similar object, or on the outside diameter thereof. The inside mounting type requires sufficient interior space and space adjacent the face to be machined for receiving the facing head. On the other hand, exterior mounting devices frequently include a bearing which is larger than the diameter of the flange to be machined and are generally of a heavy construction in order to avoid inaccuracies in finishing due to distortion of the tool during operation. Such large, heavy machines are difficult to transport and install.

A central spindle machine carrying a cutting tool thereon has the ability to face from the center of a flange outwardly while also providing stable support and drive for the cutting tool. However, machines of this type are restrictive in their capabilities. Typically, axial movement of the cutting tool is limited and access to the work surface being machined is restricted. Furthermore, automatic tool feed, radially across the flange being finished, tends to be complicated and non-adjustable. In addition, portable machine tools are quite specialized, not only as to purpose but also as to the actual size of the work which can be accommodated. For example, a portable tool adapted for facing a large flange is generally not usable for facing a small flange.

SUMMARY OF THE INVENTION

Accordingly, it is an object of the present invention to provide an improved portable facing head which is compact in construction.

It is another object of the present invention to provide an improved portable facing head having a readily adjustable radial range of facing.

It is a further object of the present invention to provide an improved portable facing head which can be utilized for flange facing in an inwardly or an outwardly radial direction.

It is another object of the present invention to provide an improved portable facing head wherein an operator may adjust the radial direction of the facing head during a facing operation.

In accordance with the present invention, a portable facing head includes a feed body and a tool head, the facing head being mounted on a workpiece to be machined and powered by a universal power unit that rotates the facing head about a rotational axis. During such rotation, a torque arm contacts the feed body so as to effect linear movement of a pair of lead screws through the feed body thereby effectively radially extending or retracting the tool head which is mounted on the lead screws.

In a particular embodiment, the torque arm comprises an elongate handle operatively connected to a pivot plate having first and second cam surfaces. Manipulation of the handle causes pivoting of the pivot plate so as to extend either the first surface or the second surface outwardly from the body of the torque arm and toward the feed body. The torque arm is preferably positioned adjacent the feed body such that upon rotation of the feed body the outwardly extending surface of the torque arm contacts and causes rotation of a star feed located on the feed body. Such rotation of the star feed effects rotation of a worm gear within the feed body that in turn engages the lead screws and effects linear motion of the lead screws through the feed body. In this manner, the tool head mounted on the lead screws is radially moved along the surface being faced as the feed body and the tool head are rotated by the universal power unit. Moreover, various lengths of axial lead screws may be employed for securing differing degrees of radial movement of the tool head.

In accordance with another aspect of the present invention, manipulation of the torque arm handle so as to further pivot the pivot plate effects extension of the other surface outwardly from the torque arm body thereby causing rotation of the star feed in a different direction. Such rotation of the star feed causes the tool head to move radially in an opposite direction along the surface being faced. Moreover, manipulation of the torque arm so as to extend each surface an equal distance from the torque arm body effects no contact with and no rotation of the star feed, and thereby results in a stationary radial position of the tool head on the surface being faced.

The present invention is compact in design in that the width of the preferred embodiment, comprising the feed body positioned adjacent the torque arm and a clamp collar, is approximately 4 inches or less as measured along the rotational axis of the feed body.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

BRIEF DESCRIPTION OF THE DRAWINGS

FIG. 2 is detailed view of the feed body shown in FIG. 1;

FIG. 4 is a cross-sectional top view of the feed body taken along lines 4—4 of FIG. 2;

FIG. 5 is a back elevational view of the torque arm shown in FIG. 1;

FIG. 6 is a partial cross-sectional side view of the torque arm and the feed body taken along lines 5—5 of FIG. 1 wherein the feed body is rotated such that the feed body lead screws are aligned with the handle of the torque arm;

FIG. 7 is a partial cross-sectional back view of the torque arm taken along lines 7—7 of FIG. 6.

DETAILED DESCRIPTION

Figure 1:
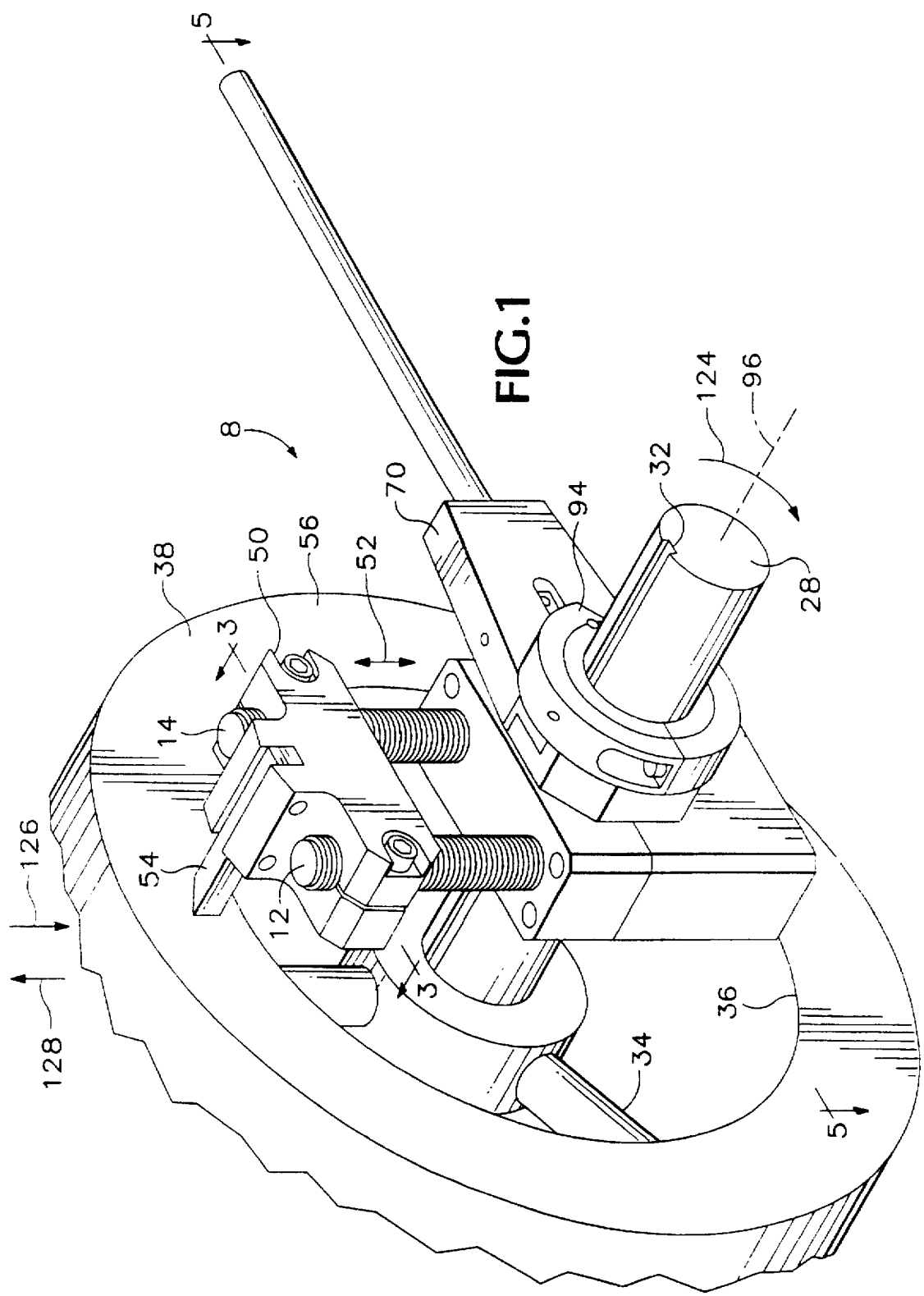
FIG. 1 is a front isometric view of a portable facing head according to the present invention mounted on a work to be faced.

With reference to the accompanying illustrations, FIG. 1 shows a portable facing head 8 embodying the invention. As shown in FIG. 2, the invention consists of a feed body portion 10 which is in threaded engagement with left hand and right hand threaded lead screws 12 and 14. The lead screws extend through body 10 and are driven by a worm gear 16 (FIG. 3) enclosed within feed body 10 wherein the worm gear is rotated by action of a star feed 18. A first portion 20 of body 10 is preferably secured to a second portion 22 by machine head screws 24. First portion 20 is not in threaded engagement with lead screws 12 and 14 but instead may freely slide up and down the lead screws when not clamped to second body portion 22.

First and second body portions 20 and 22 define an aperture 26 therebetween which is suitably shaped and sized to fit over a boring bar 28 that is rotated by a universal power unit (not shown). First portion 20 includes a key member 30 that during operation engages a corresponding slot 32 (FIG. 1) in boring bar 28.

Referring to the preferred embodiment of the invention shown in FIG. 1, boring bar 28 is associated with a work piece engaging mandrel 34 that is operable to cause engagement of mandrel 34 with the hollow interior 36 of an annular work piece 38, for example, a flanged pipe. Such mandrels are well known in the art and any suitable mandrel means could be utilized in association with the present invention.

A cutting head 50 is suitably clamped in frictional engagement to lead screws 12 and 14. Movement of lead screws 12 and 14 through feed body 10, as indicated by directional arrow 52, effectively translates cutting head 50 upwardly or downwardly relative to the feed body in the direction of arrow 52 so as to translate a cutting tool 54 radially along a surface 56 of pipe 38 as feed body 10 rotates about boring bar 28. Preferably, feed screws 12 and 14 are left and right hand screws, respectively, such that as the lead screws move linearly through feed body 10, cutting tool 54 is properly aligned with surface 56 for precision facing. In addition, the length of feed screws 12 and 14 may be varied so that it is possible to face surfaces having extremely large diameters, or extremely small diameters.

Referring now to FIG. 5, a torque arm 70 also comprises a portion of the invention wherein the torque arm includes a body 72 having an opening 74 and a split ring portion 76. Torque arm body 72 is placed over boring bar 28 by opening split ring 76 and pivoting it so as to allow the torque arm to be fitted over the boring bar. After placement of torque arm 70 on boring bar 28, the split ring is flipped back and closed to secure torque arm 70 in surrounding relation to boring bar 28. Torque arm 70 does not key to boring bar 28 so that boring bar 28 rotates freely without attendant rotation of torque arm 70. Torque arm 70 further comprises two cam members 78 and 80 which are mounted on a pivot plate 82 whereby either cam member 78 or 80 may alternately be pivoted upwardly so as to extend above the plane of surface 84 of torque arm body 72 for contacting star feed 18.

As shown in FIGS. 6 and 7, torque arm 70 further comprises an elongate handle 86 extending outwardly from body portion 72. Handle 86 includes a channel 87 and is retained in body portion 72 by a set screw 89 that extends into channel 87. Handle 86 also includes an extension bar 88 slidably received within a bar receiving slot 90 in pivot plate 82. Manipulation of handle 86 in one of the directions indicated by arrows 91 and 93 causes pivot plate 82 to pivot about a pivot point 92 such that either cam surface 78 or 80 extends upwardly above surface 84 for contacting star feed 18. Additionally, handle 86 may be manipulated such that cam members 78 and 80 both extend equal distances above surface 84. In this position neither cam surface contacts star feed 18, thereby effecting no movement of lead screws 12 and 14 through feed body 10. Accordingly, movement of lead screws 12 and 14 through feed body 10, or the stationary positioning of the lead screws in relation to the feed body, can be controlled manually by manipulation of handle 86 without reversing or stopping the rotation of boring bar 28. Furthermore, such manipulation of handle 86 can be accomplished during a facing operation without requiring access to the feed body or the universal power unit.

Figure 3:
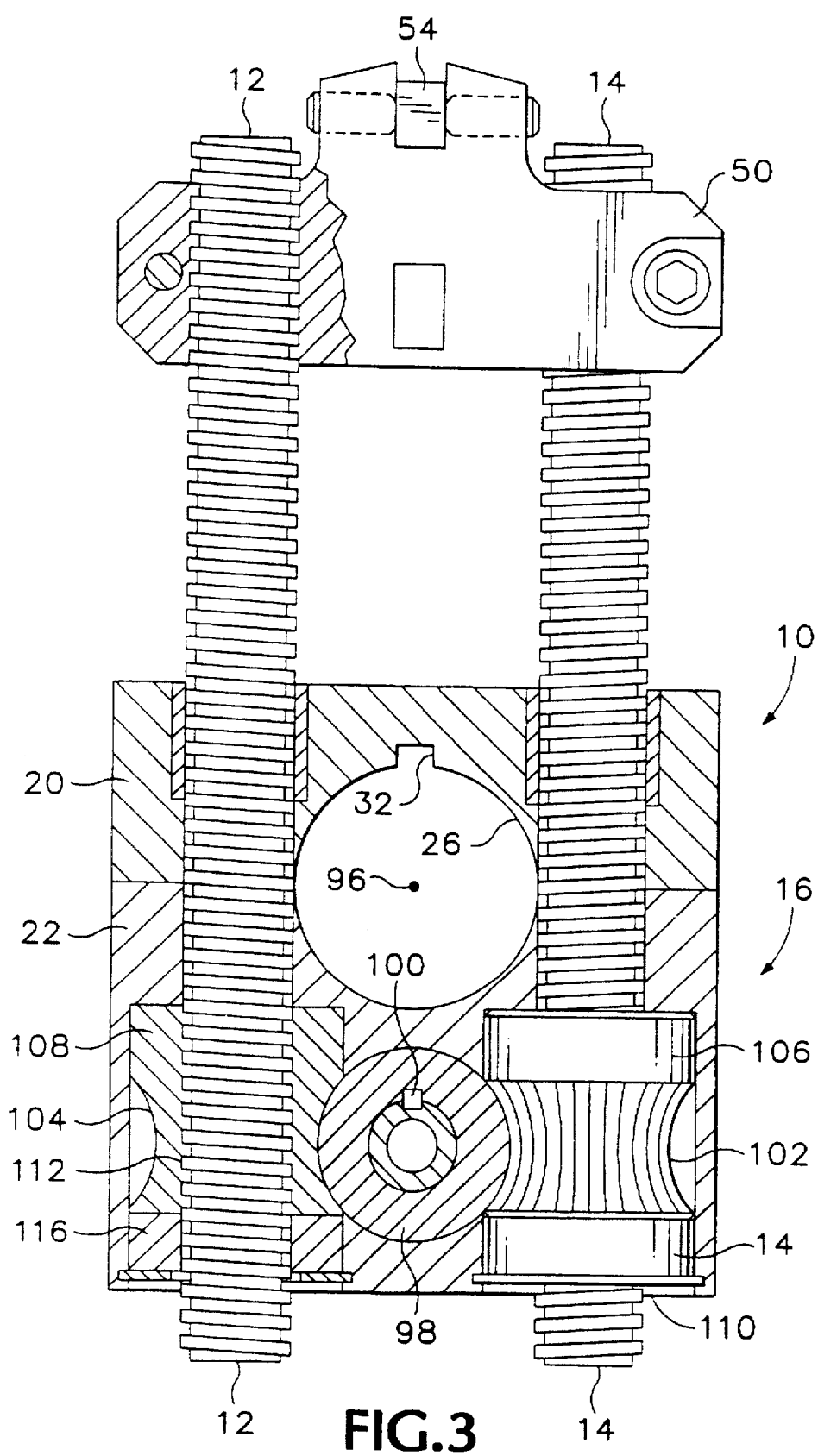
FIG. 3 is a partial cross-sectional front view of the feed body taken along lines 3—3 of FIG. 1.

Referring to FIG. 3, a partial cross-sectional front view taken along line 3—3 of FIG. 1, and to FIG. 4, a cross-sectional top view taken along lines 4—4 of FIG. 2, worm gear 16 includes a star feed adapter 98 including a slot 100 for receiving a corresponding star feed key so that rotation of star feed 18 causes rotation of adapter 98. Adapter 98 threadably engages corresponding external threads 102 and 104 of, respectively, first internal worm gear 106 and second internal worm gear 108. Internal worm gear 106 includes internal threads 110 that engage the external threads of lead screw 14 and internal worm gear 108 includes internal threads 112 that engage the external threads of lead screw 12. Accordingly, when one of the cam surfaces of torque arm 70 causes rotation of star feed 18, the rotation of star feed 18 effects rotation of star feed adapter 98. Rotation of adapter 98 in turn causes rotation of internal worm gears 106 and 108 thereby to move lead screws 12 and 14 through feed body 10. Internal worm gears 106 and 108 are retained in place within feed body 10 by worm retaining bushings, respectively, 114 and 116.

Figure 8:
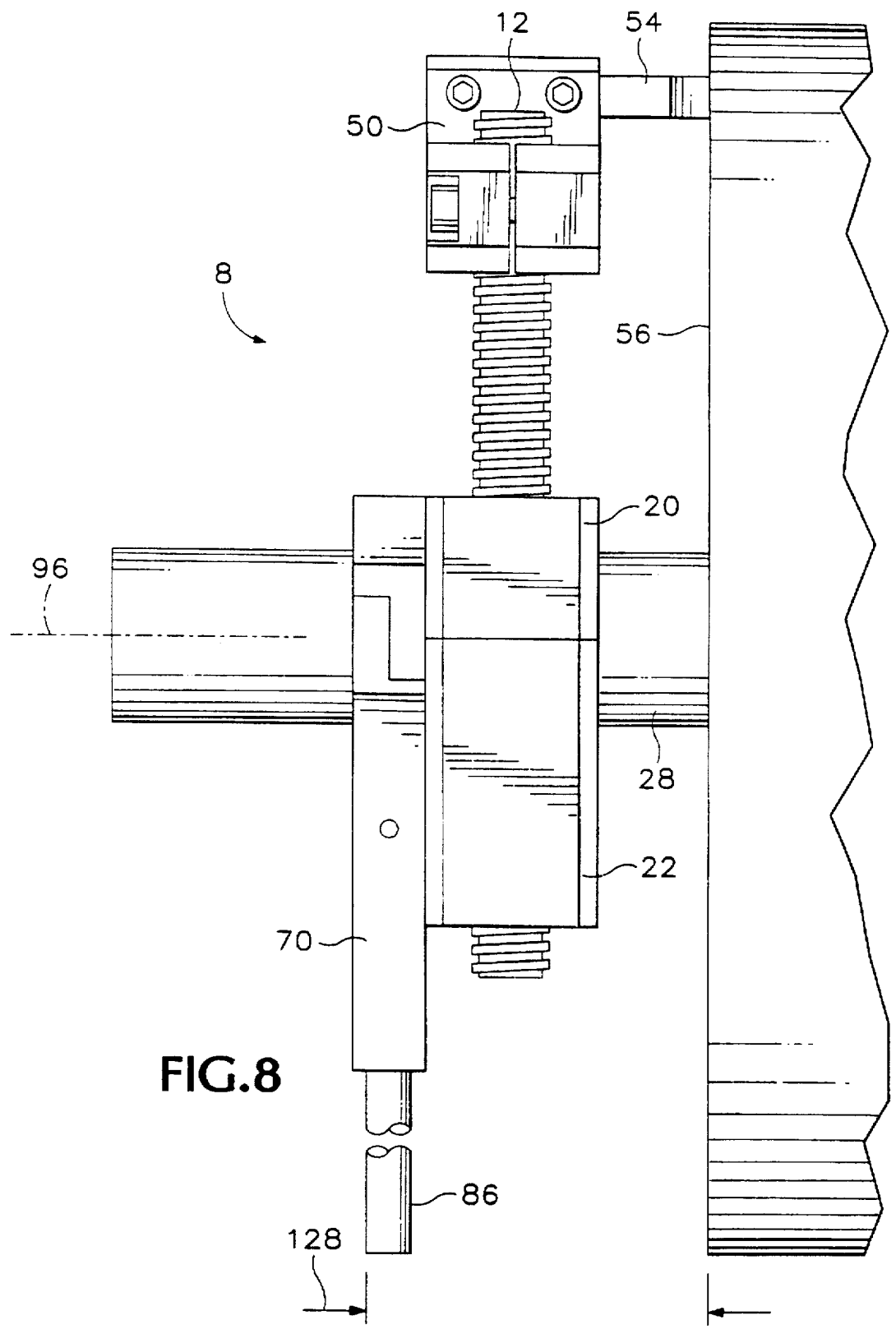
FIG. 8 is a side view of the facing head mounted on a work to be faced.

Referring to FIGS. 1 and 8, to assemble facing head 8, the universal power unit is turned off and locked. Lead screws 12 and 14 are secured in second portion 22 of feed body 10 which is placed over boring bar 28. First portion 20 is then secured to second portion 22 such that boring bar 28 is secured within aperture 26 and such that key 30 is positioned within key slot 32. Tool head 50 is secured on the lead screws such that cutting tool 54 faces surface 56 of the workpiece 38. The tool head is initially positioned at an initial radial position on surface 56 by manual rotation of star feed 18 through use of a common Allen wrench (not shown) that is received in the center of star feed 18.

Torque arm 70 is then positioned on boring bar 28 such that the cam surfaces face toward feed body 10. The torque arm handle 86 is then preferably rotated to extend one of the cam surfaces outwardly of the torque arm body. The handle is then tied down to a stationary object adjacent the object being faced. A clamp collar 94, which is adapted to fit around and in engaging relation with boring bar 28, is clamped to boring bar 28 such that the torque arm is held in close engagement with the feed body and such that cutting tool 54 is in close engagement with surface 56 of pipe 38. The power unit is then turned on to begin the facing operation. The facing head is disassembled by reversal of the above-recited assembly order.

As the power unit is turned on, it causes rotation of boring bar 28, which in turn causes feed body 10, lead screws 12 and 14, and cutting tool 54 to rotate about a rotational axis 96. Each time feed body 10 and boring bar 28 complete one revolution about axis 96, the extended torque arm cam member engages star feed 18, causing the star feed to advance one portion of a revolution. In the preferred embodiment, wherein star feed 18 comprises five star leg portions 86, one portion of a revolution is 72°. Such rotation of star feed 18 rotates worm gear 16 by a predetermined amount which in turn causes feed screws 12 and 14 to move within feed body 10 in one of the directions indicated by arrow 52. Accordingly, as lead screws 12 and 14 advance through feed body 10, and as feed body 10 rotates about axis 96, cutting tool 54 is rotated over surface 56 and simultaneously is moved radially along surface 56 such that cutter 54 performs a facing operation on the surface. In the preferred embodiment, each time star feed 18 is engaged by cam member 78 or 80, machining head 50 will effectively extend or retract approximately 10/1000ths of an inch toward or away from boring bar 28 as a result of the driving rotation of worm gear 16.

Referring again to FIGS. 2 and 6, in the preferred embodiment, manipulation of handle 86 such that cam surface 80 extends outwardly from torque arm surface 84 and contacts star feed leg 86 in an upper position, i.e., positioned away from axis 96, effects counterclockwise rotation of star feed 18 as feed body 10 rotates in direction 124 (FIG. 1). Such counterclockwise rotation of star feed 18 causes rotation of internal worm gears 106 and 108 thereby translating lead screws 12 and 14 through the feed body such that the cutting head moves radially inwardly along direction 126 on surface 56. In another embodiment, cutting head 50 may be positioned on lead screws 12 and 14 such that cutting tool 54 is positioned on the inner side of cutting tool 50, i.e., toward axis 96. In this arrangement, cutting tool 54 may face surfaces inwardly to a diameter of 2.5 inches.

Manipulation of handle 86 such that cam surface 78 extends outwardly above torque arm surface 84 and contacts star feed leg 86 in a lower position, i.e., positioned close to axis 96, causes clockwise rotation of star feed 18 upon rotation of feed body 10 in direction 124 (FIG. 1). Such clockwise rotation of star feed 18 causes rotation of internal worm gears 106 and 108, thereby translating lead screws 12 and 14 through the feed body such that the cutting head moves radially outwardly along direction 128 on surface 56 of pipe 38. Lead screws 12 and 14 may be 15 inches in length such that feed body 10 may be used to face surfaces outwardly to a diameter of 20 inches. In another embodiment, the lead screws may be longer in order to permit facing of surfaces having a diameter greater than 20 inches.

In the preferred embodiment, the width of facing head 8 measured along rotational axis 96 comprises the width of feed body 10, torque arm 70 and clamp ring 94. As shown in FIG. 8, the total width 128 of the facing head is approximately 4 inches or less so that it is possible to perform radially adjustable facing operations in a relatively constricted area which may not allow use of a bulky or heavy feed body.

The facing head is preferably manufactured of a durable, lightweight material that is resistant to corrosion. Preferably, feed body 10, cutting head 50 and torque arm 70 are manufactured of lightweight aluminum. Lead screws 12 and 14, and internal worm gears 106 and 108 are preferably manufactured of hardened steel.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A portable facing head comprising:
   a lead member having a radial axis of translation;
   a tool head mounted on the lead member;
   a feed body adapted for rotation about a rotational axis, the feed body operatively connected to the lead member and including a star feed that engages a worm gear, the worm gear adapted to engage the lead member so as to translate the lead member through the feed body such that the tool head moves toward or away from the feed body and along the radial axis of translation upon rotation of the star feed in, respectively, a first or a second direction; and
   a torque arm positioned adjacent the feed body and including a pivot plate having first and second surfaces, the pivot plate pivotable such that either the first surface or the second surface extends outwardly toward the feed body and contacts the star feed to rotate it in, respectively, the first or the second direction upon rotation of the feed body about the rotational axis.

2. A portable facing head comprising:
   a lead member having an axis of translation;
   a tool head mounted on the lead member;
   a feed body adapted for rotation about a rotational axis, the feed body operatively connected to the lead member and including a star feed that engages a worm gear, the worm gear adapted to engage the lead member so as to translate the lead member through the feed body such that the tool head moves toward or away from the feed body and along the axis of translation upon rotation of the star feed in, respectively, a first or a second direction;
   a torque arm positioned adjacent the feed body and including a pivot plate having first and second surfaces, the pivot plate pivivotable such that either the first surface or the second surface extends outwardly toward the feed body and contacts the star feed to rotate it in, respectively, the first or the second direction upon rotation of the feed body about the rotational axis; and
   a boring bar operatively connected to the feed body such that rotation of said boring bar causes rotation of said feed body about its rotational axis.

3. A portable facing head according to claim 2 wherein said feed body comprises a first portion and a second portion that define an aperture therebetween for therein fittably receiving said boring bar.

4. A portable facing head according to claim 1 wherein said pivot plate includes a pivot point and wherein said torque arm further comprises a handle operatively connected to said pivot plate such that manipulation of said handle causes said pivot plate to pivot about its pivot point.

5. A portable facing head according to claim 1 wherein said facing head has a width measured along said rotational axis of approximately 4 inches or less.

6. A portable facing head comprising:
   a lead member having an axis of translation;
   a tool head mounted on the lead member;
   a feed body adapted for rotation about a rotational axis, the feed body operatively connected to the lead member and including a star feed that engages a worm gear, the worm gear adapted to engage the lead member so as to translate the lead member through the feed body such that the tool head moves toward or away from the feed body and along the axis of translation upon rotation of the star feed in, respectively, a first or a second direction;

a torque arm positioned adjacent the feed body and including a pivot plate having first and second surfaces, the pivot plate pivotable such that either the first surface or the second surface extends outwardly toward the feed body and contacts the star feed to rotate it in, respectively, the first or the second direction upon rotation of the feed body about the rotational axis; and another lead member positioned such that both lead members engage the worm gear so as to translate both lead members toward or away from the feed body and along the axis of translation.

7. A portable facing head according to claim 1 wherein the lead member includes threads and wherein the worm gear threadably engages the threads so as to translate the lead member through the feed body such that the tool head moves along the axis of translation in predetermined increments for each complete rotation of the feed body about its rotational axis.

8. A portable facing machine comprising:

dual translation means each having an axis of translation;

facing means operatively connected to said dual translation means;

feed means adapted for rotation about a rotational axis, the feed means operatively connected to the dual translation means and including engagement means adapted to engage the dual translation means so as to translate the dual translation means relative to the feed means and along said axis of translation upon rotation of the feed means about its rotational axis; and torque means positioned adjacent the feed means and including pivot means having first and second engagement surfaces, the pivot means pivotable such that either the first engagement surface or the second engagement surface rotates the engagement means in respective first and second directions upon rotation of the feed means.

9. The portable facing machine according to claim 8 further comprising power means that rotates said feed means about its rotational axis.

10. A portable facing machine comprising:

translation means having an axis of translation;

facing means operatively connected to said translation means;

feed means adapted for rotation about a rotational axis, the feed means operatively connected to the translation means and including engagement means adapted to engage the translation means so as to translate the translation means relative to the feed means and along said axis of translation upon rotation of the feed means about its rotational axis;

torque means positioned adjacent the feed means and including pivot means having first and second engagement surfaces, the pivot means pivotable such that either the first engagement surface or the second engagement surface rotates the engagement means in respective first and second directions upon rotation of the feed means; and power means that rotates said feed means about its rotational axis, wherein said feed means comprises a first portion and a second portion that define an aperture therebetween for therein fittably receiving said power means.

11. A portable facing machine according to claim 8 wherein said pivot means includes a pivot point and wherein said torque means further comprises handle means operatively connected to said pivot means such that manipulation of said handle means causes said pivot means to pivot about its pivot point.

12. A portable facing machine according to claim 8 wherein said facing machine has a width measured along the rotational axis of approximately 4 inches or less.

13. A portable facing machine according to claim 8 wherein said facing machine further comprises another translation means positioned such that both translation means engage the engagement means so as to translate both the translation means relative to the feed means and along the axis of translation.

14. A portable facing machine according to claim 8 wherein the translation means includes threads and wherein the engagement means threadably engages the threads so as to translate the translation means relative to the feed means and along the axis of translation in predetermined increments for each complete rotation of the feed means about its rotational axis.

15. A method of facing a surface comprising:

providing a portable facing head including:

translation means having an axis of translation;

facing means operatively connected to said translation means;

feed means adapted for rotation about a rotational axis, the feed means operatively connected to the translation means and including engagement means adapted to engage the translation means so as to translate the translation means relative to the feed means and along said axis of translation upon rotation of the feed means about its rotational axis; and torque means positioned adjacent the feed means and including pivot means having first and second engagement surfaces, the pivot means pivotable such that either the first engagement surface or the second engagement surface rotates the engagement means in respective first and second directions upon rotation of the feed means;

causing rotation of the feed means;

manipulating the torque means so as to pivot the pivot means such that the first engagement surface extends outwardly toward the feed means such that upon rotation of the feed means the first engagement surface contacts the engagement means causing it to rotate in a first direction so as to translate the translation means relative to the feed means thereby moving the facing means radially outwardly along the surface being faced; and further manipulating said torque means so as to pivot the pivot means such that the first and the second engagement surface extend equally outwardly toward the feed means such that upon rotation of the feed means neither the first nor the second engagement surface contacts the engagement means thereby causing no rotation of the engagement means such that the facing means does not move radially along the surface being faced as the feed means rotates about its rotational axis.

\* \* \* \* \*